(12) United States Patent
Su et al.

(10) Patent No.: US 12,027,952 B2
(45) Date of Patent: Jul. 2, 2024

(54) SUPERCONDUCTING POWER GENERATION DEVICE AND POWER GENERATION METHOD

(71) Applicant: Huazhong University of Science and Technology, Wuhan (CN)

(72) Inventors: Bin Su, Wuhan (CN); Zheng Ma, Wuhan (CN); Chunze Yan, Wuhan (CN); Yusheng Shi, Wuhan (CN)

(73) Assignee: Huazhong University of Science and Technology, Wuhan (CN)

(*) Notice: Subject to any disclaimer, the term of this patent is extended or adjusted under 35 U.S.C. 154(b) by 77 days.

(21) Appl. No.: 17/646,376

(22) Filed: Dec. 29, 2021

(65) Prior Publication Data

US 2023/0163674 A1  May 25, 2023

(30) Foreign Application Priority Data

Nov. 22, 2021 (CN) .......................... 202111386895.3

(51) Int. Cl.
*H02K 55/00* (2006.01)
*H02K 5/20* (2006.01)
*H02K 9/19* (2006.01)

(52) U.S. Cl.
CPC ............... *H02K 55/00* (2013.01); *H02K 5/20* (2013.01); *H02K 9/19* (2013.01)

(58) Field of Classification Search
CPC ............. H02K 55/00; H02K 5/20; H02K 9/19
See application file for complete search history.

(56) References Cited

U.S. PATENT DOCUMENTS

| 5,430,009 A * | 7/1995 | Wang ..................... H02K 35/00 |
| | | 310/16 |
| 2012/0046174 A1* | 2/2012 | Vaucher ................. H02K 53/00 |
| | | 74/DIG. 9 |

(Continued)

FOREIGN PATENT DOCUMENTS

| CN | 101644240 B | 2/2010 |
| CN | 105917560 B | 8/2016 |
| CN | 209557174 U | 10/2019 |

*Primary Examiner* — Tulsidas C Patel
*Assistant Examiner* — Joshua Kiel M Rodriguez
(74) *Attorney, Agent, or Firm* — Nitin Kaushik

(57) ABSTRACT

The present disclosure provides a superconducting power generation device and a power generation method. The device includes a superconductor, a conductive coil, a permanent magnet and a cooling medium. When ambient temperature is lower than its superconducting critical temperature, the superconductor, made of the second-type superconducting material, is capable of generating a magnetic levitation force to an outer permanent magnet and levitate it. When an external force is applied to the permanent magnet, its position changes compared to the conductive coil, which affects the magnetic flux passing through the coil and induces the generation of electromotive force in the coil, thereby converting mechanical energy to electric energy. By using the device provided by the present disclosure, the conversion from the mechanical energy to the electric energy in an ultra-low temperature environment can be achieved, and thus, problems about energy sources on low-temperature celestial bodies in extrasolar systems are solved.

3 Claims, 3 Drawing Sheets

(56) References Cited

U.S. PATENT DOCUMENTS

2013/0252819 A1\* 9/2013 Zakuskin ............... H02K 55/00
310/46
2015/0087523 A1\* 3/2015 Fleck ....................... H02K 1/17
310/52

\* cited by examiner

SUPERCONDUCTING POWER GENERATION DEVICE AND POWER GENERATION METHOD

CROSS-REFERENCE TO RELATED APPLICATIONS

The application claims priority to Chinese patent application No. 2021113868953, filed on Nov. 22, 2021, the entire contents of which are incorporated herein by reference.

TECHNICAL FIELD

The present disclosure relates to the field of ambient energy conversion, in particular to a superconducting power generation device and a power generation method.

BACKGROUND

Space exploration is one of the developing tendencies of science and technology from human beings. With the development of science and technology, space exploration activities are becoming increasingly frequent. It has been known that human beings stepped onto the moon and Mars, and they are expected to step onto remoter celestial bodies. Subject to the constraint on light irradiation intensity of the sun to other celestial bodies, ambient temperatures of celestial bodies in extrasolar systems are much lower than the surface temperature of the earth. Such ambient temperatures are close to a superconducting transition temperature of a second-type superconductor. Owing to the excellent critical current density, superconducting materials have been utilized in superconducting power generation devices, such as the rotary superconducting power generator, the high-speed levitation superconducting power generator or the superconducting wind power generation device. However, the role of the superconducting material is restricted to the cable in these devices, which is lack of more extensive study on ambient mechanical energy conversion.

It is necessary to overcome technical defects existing in the application of superconducting materials in superconducting power generation devices on low-temperature celestial bodies in the extrasolar systems.

SUMMARY

For this purpose, the present disclosure provides a superconducting power generation device to solve or at least partially solve technical problems existing in the prior art.

The present disclosure provides a superconducting power generation device, including:
  a superconductor made of a second-type superconducting material;
  a conductive coil located above the superconductor;
  a permanent magnet; and
  a cooling medium used for cooling the superconductor until the temperature is lower than a superconducting critical temperature, wherein the superconductor captures a magnetic flux and generates a magnetic levitation force after being cooled so as to levitate the permanent magnet.

Preferably, for the superconducting power generation device, the second-type superconducting material includes at least one of $YBa_2Cu_3O_7$, $(Bi, Pb)_2Sr_2Ca_2Cu_3O_x$, $HgBa_2CaCu_2O_x$, $HgBa_2Ca_2Cu_3O_x$, $Tl_2Ba_2Ca_2Cu_3O_x$, HgTlBaCaCuO, $MgB_2$, $PbMo_6S_8$, $V_3Si$, $V_3Ga$, $Nb_3Ge$, $Nb_3Al$, $Nb_3Sn$, $Nb_{37}Ti_{63}$ and Nb.

Preferably, for the superconducting power generation device, the conductive coil is a conductive metal coil.

Preferably, for the superconducting power generation device, the permanent magnet is made of any one of Nd—Fe—B alloy, Al—Ni—Co alloy, a permanent magnetic ferrite material, a permanent magnetic rare-earth Co material and permanent magnetic Fe—Co—V alloy.

Preferably, for the superconducting power generation device, the intensity of a magnetic field on the surface of the permanent magnet is 30 mT to 1.0 T.

Preferably, the superconducting power generation device further includes a container, wherein the superconductor and the conductive coil are both located in the container, the permanent magnet is located outside the container in which a cooling channel is further formed, and a cooling medium enters the container via the cooling channel and cools the superconductor.

Preferably, for the superconducting power generation device, the cooling medium includes any one of liquefied $CF_4$, liquid nitrogen, liquid hydrogen and liquid helium.

Preferably, for the superconducting power generation device, the conductive coil is a multi-turn coil formed by winding a metal wire which has a diameter of 0.1-1 mm.

Preferably, for the superconducting power generation device, the container is further filled with thermal insulation material.

On a second aspect, the present disclosure further provides a power generation method including the following steps:
  providing the superconducting power generation device;
  introducing a cooling medium so that a superconductor is cooled to capture magnetic flux and generate a magnetic levitation force to levitate a permanent magnet; and
  applying an acting force to a permanent magnet to make the permanent magnet vibrate to change relative positions of the permanent magnet and a conductive coil, change the magnetic flux passing through the conductive coil and further generate an induced electromotive force by induction, so that conversion from mechanical energy to electric energy is achieved.

Compared with the prior art, the superconducting power generation device provided by the present disclosure has the following beneficial effects:
  the present disclosure provides a superconducting power generation device and a power generation method. The power generation device includes a superconductor, a conductive coil, a permanent magnet and a cooling medium. The superconductor is made of a second-type superconducting material, and when an ambient temperature is lower than a superconducting critical temperature of the second-type superconducting material, the second-type superconducting material is capable of generating a magnetic levitation force to an outer magnet so as to levitate the permanent magnet. At the moment, an acting force is applied to the permanent magnet, the position of the permanent magnet is changed relative to that of the conductive coil after the force is removed, and then, magnetic field distribution around the conductive coil is changed, so that the magnetic flux passing through the coil is changed, an induced electromotive force is generated in the coil, and then, conversion from mechanical energy to electric energy is achieved. By using the device provided by the present disclosure, the conversion from mechanical energy to electric energy in an ultra-low temperature environment can be achieved, and thus, problems about energy sources on low-temperature celestial bodies in extrasolar systems can be solved.

BRIEF DESCRIPTION OF DRAWINGS

To describe the technical solutions in the embodiments of the present disclosure or the prior art more clearly, the following briefly introduces the accompanying drawings required for describing the embodiments of the prior art. Apparently, the accompanying drawings in the following description show only some embodiments of the present disclosure, and those of ordinary skill in the art may still derive other accompanying drawings from these accompanying drawings without creative efforts.

DETAILED DESCRIPTION OF THE EMBODIMENTS

In order to make objectives, technical solutions and advantages of the embodiments of the present disclosure clearer, the technical solutions in the embodiments of the present disclosure will be described clearly and completely below in conjunction with the accompanying drawings in the embodiments of the present disclosure. Apparently, the described embodiments are a part of the embodiments of the present disclosure, not all the embodiments. Generally, components, described and shown in the accompanying drawings herein, in the embodiments of the present disclosure, may be arranged and designed according to various different configurations.

Therefore, the following detailed description, provided in the accompanying drawings, of the embodiments of the present disclosure is only intended to indicate selected embodiments of the present disclosure, rather than to limit the scope protected to be protected in the present disclosure. Based on the embodiments in the present disclosure, all other embodiments obtained by those of ordinary skill in the art without creative work shall fall within the protective scope of the present disclosure.

It should be noted that similar numerals and letters indicate similar items in the following accompanying drawings, and therefore, once a certain item is defined in an accompanying drawing, it should not be further defined and explained in the subsequent accompanying drawings.

In the description of the present disclosure, it should be understood that a directional or positional relationship indicated by a term such as "upper" is a directional or positional relationship based on the accompanying drawings or a directional or positional relationship usually adopted when the product provided by the present disclosure is used, or a directional or positional relationship usually understood by the skilled in the art, are merely intended to facilitate describing the present disclosure and simplifying the description, rather than to indicate or imply that the appointed equipment or element has to be located in a specific direction or structured and operated in the specific direction so as not to be understood as restrictions on the present disclosure.

In addition, terms such as "first" and "second" are merely intended to distinguish description, and cannot be understood as indicating or implying the relative importance.

The technical solutions in the implementation manners of the present disclosure will be described clearly and completely below in conjunction with the implementation manners of the present disclosure. Apparently, the described implementation manners are only a part of the implementation manners of the present application, not all the implementation manners. Based on the implementation manners of the present disclosure, all other implementation manners obtained by those of ordinary skill in the art without creative work shall fall within the protective scope of the present disclosure.

Figure 1:
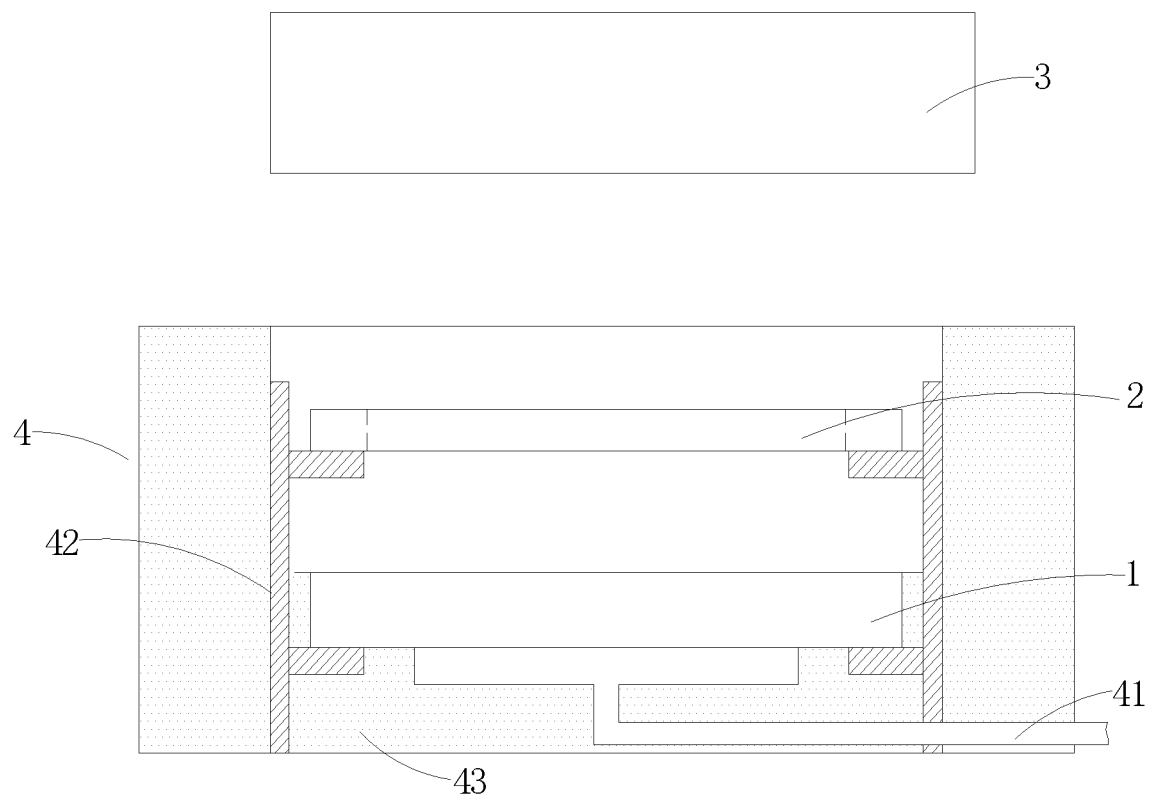
FIG. 1 shows a schematic structural diagram of a superconducting power generation device provided by the present disclosure.

An embodiment of the present application provides a superconducting power generation device, as shown in FIG. 1, including:
 a superconductor 1 made of a second-type superconducting material;
 a conductive coil 2 located above the superconductor 1;
 a permanent magnet 3; and
 a cooling medium used for cooling the superconductor until the temperature is lower than a superconducting critical temperature, wherein the superconductor captures a magnetic flux and generates a magnetic levitation force after being cooled so as to levitate the permanent magnet.

It should be noted that the superconducting power generation device in the embodiment of the present application includes a superconductor 1, a conductive coil 2, a permanent magnet 3 and a cooling medium. Superconductor 1 is made of a second-type superconducting material, and the second-type superconducting material has the properties of capturing a magnetic flux and generating a magnetic levitation force to an outer magnet when an ambient temperature is lower than a superconducting critical temperature of the second-type superconducting material so that it may be used for generating certain relative distance separation of a magnetic/electrical structure of a magnetic power generation device. Specifically, when the temperature of superconductor 1 is lower than the superconducting critical temperature, superconductor 1 generates the magnetic levitation force so as to levitate the permanent magnet 3. The cooling medium in the present application is used for providing a low-temperature environment for cooling the cooling medium. Apparently, the device may be directly used in the low-temperature environment where the superconductor may be cooled until the temperature is lower than the superconducting critical temperature, and the superconductor 1 does not need to be additionally cooled. When the permanent magnet 3 is levitated due to the magnetic levitation force generated by the superconductor 1, an acting force may be applied to the permanent magnet 3, specifically, a force opposite to the magnetic levitation force is applied, the position of the permanent magnet 3 is changed relative to that of the conductive coil after the force is removed, and then, magnetic field distribution around the conductive coil is changed, so that the magnetic flux passing through the coil is changed, an induced electromotive force is generated in the coil, and then, conversion from mechanical energy to electric energy is achieved. By using the device provided by the present disclosure, the conversion from mechanical energy to electric energy in an ultra-low temperature environment can be achieved, and thus, problems about energy sources on low-temperature celestial bodies in extrasolar systems can be solved.

In some embodiments, the second-type superconducting material includes at least one of $YBa_2Cu_3O_7$, $(Bi, Pb)_2Sr_2Ca_2Cu_3O_x$, $HgBa_2CaCu_2O_x$, $HgBa_2Ca_2Cu_3O_x$, $Tl_2Ba_2Ca_2Cu_3O_x$, HgTlBaCaCuO, $MgB_2$, $PbMo_6S_8$, $V_3Si$, $V_3Ga$, $Nb_3Ge$, $Nb_3Al$, $Nb_3Sn$, $Nb_{37}Ti_{63}$ and Nb. For example, the superconducting critical temperature is up to 90K (−185.15° C.) or above which breaks through the "temperature barrier" (77K) of the liquid nitrogen and is also higher than temperatures of celestial bodies in extrasolar systems (20-30K).

In some embodiments, the conductive coil 2 is a conductive metal coil specifically including, but not limited to conductive gold, silver and copper coils, and is preferably the conductive copper coil which has very low electrical resistivity in an ultra-low-temperature environment, and thus, the overall power generation device has the power supply characteristic of high-power output.

In some embodiments, the permanent magnet 3 is made of any one of Nd—Fe—B alloy, Al—Ni—Co alloy, a permanent magnetic ferrite material, a permanent magnetic rare-earth Co material and permanent magnetic Fe—Co—V alloy. There are no requirements on the shape of the permanent magnet 3, it may be of a cube, a cuboid, a cylinder and the like, and the specific shape may be selected according to a use condition.

In some embodiments, the intensity of a magnetic field on the surface of the permanent magnet is 30 mT to 1.0 T.

In some embodiments, the superconducting power generation device further includes a container 4, the superconductor 1 and the conductive coil 2 are both located in container 4, the permanent magnet 3 is located outside container 4 in which a cooling channel 41 is further formed, and a cooling medium enters the container 4 via the cooling channel and cools the superconductor 1.

Specifically, in the above-mentioned embodiment, the superconductor 1 and the conductive coil 2 are both fixed to container 4, and meanwhile, container 4 is further provided with the cooling channel 41 by which a cooling medium is introduced to container 4 so as to cool the superconductor.

In some embodiments, the cooling medium includes any one of liquefied $CF_4$, liquid nitrogen, liquid hydrogen and liquid helium.

In some embodiments, the conductive coil 2 is a multi-turn coil formed by winding a metal wire which has a diameter of 0.1-1 mm.

In some embodiments, container 4 is further filled with thermal insulation material 43.

Specifically, further reference is made to FIG. 1, a support frame 42 is arranged in container 4, the conductive coil 2 and the superconductor 1 are both fixed to the support frame 42, and the cooling channel 41 is arranged in container 4. One end of the cooling channel 41 is close to the bottom of the superconductor 1, and the other end thereof penetrates out of container 4. Meanwhile, the thermal insulation material 43 is further arranged in the container 4; in fact, the thermal insulation material 43 may also be wrapped on the periphery of the outer wall of container 4; and specifically, the thermal insulation material 43 may be a foamed thermal insulation material and the like.

In some embodiments, ends of the conductive coil 2 penetrate out of container 4, and the penetrating parts are used as electrodes.

Based on the same inventive concept, an embodiment of the present application further provides a power generation method, including the following steps:

S1, the above-mentioned superconducting power generation device is provided;

S2, a cooling medium is introduced so that a superconductor is cooled to capture magnetic flux and generate a magnetic levitation force to levitate a permanent magnet; and S3, an acting force is applied to a permanent magnet to make the permanent magnet vibrate to change relative positions of the permanent magnet and a conductive coil, change the magnetic flux passing through the conductive coil and further generate an induced electromotive force by induction, so that conversion from mechanical energy to electric energy is achieved.

According to the power generation method provided by the present application, the above-mentioned superconducting power generation device is provided, the permanent magnet is placed above the conductive coil, then, the cooling medium is introduced to cool the superconductor, when the temperature of the superconductor is lower than a superconducting critical temperature, the superconductor is capable of capturing the magnetic flux and generating the magnetic levitation force for the permanent magnet so as to further levitate the permanent magnet, and thus, an acting force is applied to the permanent magnet. Specifically, the acting force opposite to the magnetic levitation force is applied to the permanent magnet; since the magnetic levitation force is upward, herein, a downward force is applied to the permanent magnet, the permanent magnet returns to a levitation balance position under the action of the upward magnetic levitation force after the force is removed; and since the position of the permanent magnet is changed relative to that of the conductive coil, the magnetic field distribution around the conductive coil is changed, so that the magnetic flux passing through the conductive coil is changed, an induced electromotive force is generated in the coil, and then, conversion from mechanical energy to electric energy is achieved.

Specifically, the acting force opposite to the magnetic levitation force in the direction and applied to the permanent magnet may be from collision of a small-sized object to the permanent magnet and collision of an air flow to the permanent magnet and may also make the overall device vibrate and further make the permanent magnet vibrate so that the relative positions of the permanent magnet and the conductive coil are changed. For example, it is possible that weight is released at a certain height above the permanent magnet to fall on the permanent magnet to generate an impact force by which the permanent magnet descends, then, the permanent magnet returns to the levitation balance position under the action of the upward magnetic levitation force with the drop of the weight, and the position of the magnet is changed relative to that of the coil, and thus, an induced voltage is generated. The power generation device and the power generation method provided by the present application will be further described below with specific embodiments.

Embodiment 1

The embodiment of the present application provides a superconducting power generation device including a container, a superconductor, a conductive coil and a permanent magnet, the superconductor and the conductive coil are both located in the container, the conductive coil is located above the superconductor, the permanent magnet is located above the container in which a cooling channel is formed, and a cooling medium is introduced to the container via the cooling channel and is capable of cooling the superconductor;

the superconductor is made of $YBa_2Cu_3O_7$ and is manufactured by using a method including a commercially purchased $YBa_2Cu_3O_7$ strip with the length of 50 mm, the width of 10 mm and the thickness of 1 mm is wrapped and packaged to form a cubic superconductor (with the length of 50 mm, the width of 50 mm and the thickness of 10 mm);

a manufacturing method of the conductive coil includes: a 0.1 mm enamelled copper wire is used to customize a conductive coil with an internal diameter of 5 mm, an external diameter of 50 mm and the turn number of 5000;

the permanent magnet is an Nd—Fe—B permanent magnet with a weight of about 165 g, a diameter of 50 mm, a thickness of 10 mm and a surface magnetic intensity of 180 mT; and a power generation method for the above-mentioned superconducting power generation device specifically includes: the permanent magnet is placed above the container, the cooling medium is introduced to the container via the cooling channel to cool the superconductor, and thus when the temperature of the superconductor is lower than a superconducting critical temperature thereof, the superconductor is capable of capturing the magnetic flux and generating the magnetic levitation force for the permanent magnet so as to further levitate the permanent magnet; and then, a glass bead with the weight of 10.4 g is used to fall on the levitated permanent magnet from a height of 10 cm to measure a voltage signal of the conductive coil, so that an induced voltage which is about 2.5 V may be obtained.

Embodiment 2

The embodiment of the present application provides a superconducting power generation device including a container, a superconductor, a conductive coil and a permanent magnet, the superconductor and the conductive coil are both located in the container, the conductive coil is located above the superconductor, the permanent magnet is located above the container in which a cooling channel is formed, and a cooling medium is introduced to the container via the cooling channel and is capable of cooling the superconductor;

the superconductor is made of $YBa_2Cu_3O_7$ and is manufactured by using a method including a commercially purchased $YBa_2Cu_3O_7$ strip with the length of 50 mm, the width of 10 mm and the thickness of 1 mm is wrapped and packaged to form a cubic superconductor (with the length of 50 mm, the width of 50 mm and the thickness of 10 mm);

a manufacturing method of the conductive coil includes: a 0.1 mm enamelled copper wire is used to customize a conductive coil with an internal diameter of 5 mm, an external diameter of 50 mm and the turn number of 6000;

the permanent magnet is an Nd—Fe—B permanent magnet with a weight of about 165 g, a diameter of 50 mm, a thickness of 10 mm and the surface magnetic intensity of 180 mT; and a power generation method for the above-mentioned superconducting power generation device specifically includes: the permanent magnet is placed above the container, the cooling medium is introduced to the container via the cooling channel to cool the superconductor, and thus when the temperature of the superconductor is lower than a superconducting critical temperature thereof, the superconductor is capable of capturing the magnetic flux and generating the magnetic levitation force for the permanent magnet so as to further levitate the permanent magnet; and then, a glass bead with the weight of 10.4 g is used to fall on the levitated permanent magnet from a height of 10 cm to measure a voltage signal of the conductive coil, so that an induced voltage which is about 3.4 V may be obtained.

Embodiment 3

The embodiment of the present application provides a superconducting power generation device including a container, a superconductor, a conductive coil and a permanent magnet, the superconductor and the conductive coil are both located in the container, the conductive coil is located above the superconductor, the permanent magnet is located above the container in which a cooling channel is formed, and a cooling medium is introduced to the container via the cooling channel and is capable of cooling the superconductor;

the superconductor is made of $YBa_2Cu_3O_7$ and is manufactured by using a method including a commercially purchased $YBa_2Cu_3O_7$ strip with the length of 50 mm, the width of 10 mm and the thickness of 1 mm is wrapped and packaged to form a cubic superconductor (with the length of 50 mm, the width of 50 mm and the thickness of 10 mm);

a manufacturing method of the conductive coil includes: a 0.1 mm enamelled copper wire is used to customize a conductive coil with an internal diameter of 5 mm, an external diameter of 50 mm and the turn number of 5000;

the permanent magnet is an Nd—Fe—B permanent magnet with a weight of about 85 g, a diameter of 50 mm, a thickness of 5 mm and the surface magnetic intensity of 110 mT; and a power generation method for the above-mentioned superconducting power generation device specifically includes: the permanent magnet is placed above the container, the cooling medium is introduced to the container via the cooling channel to cool the superconductor, and thus when the temperature of the superconductor is lower than a superconducting critical temperature thereof, the superconductor is capable of capturing the magnetic flux and generating the magnetic levitation force for the permanent magnet so as to further levitate the permanent magnet; and then, a glass bead with the weight of 10.4 g is used to fall on the levitated permanent magnet from a height of 10 cm to measure a voltage signal of the conductive coil, so that an induced voltage which is about 2.7 V may be obtained.

Embodiment 4

The embodiment of the present application provides a superconducting power generation device including a container, a superconductor, a conductive coil and a permanent magnet, the superconductor and the conductive coil are both located in the container, the conductive coil is located above the superconductor, the permanent magnet is located above the container in which a cooling channel is formed, and a cooling medium is introduced to the container via the cooling channel and is capable of cooling the superconductor;

the superconductor is made of $YBa_2Cu_3O_7$ and is manufactured by using a method including a commercially purchased $YBa_2Cu_3O_7$ strip with the length of 50 mm, the width of 10 mm and the thickness of 1 mm is wrapped and packaged to form a cubic superconductor (with the length of 50 mm, the width of 50 mm and the thickness of 10 mm);

a manufacturing method of the conductive coil includes: a 0.1 mm enamelled copper wire is used to customize a conductive coil with an internal diameter of 5 mm, an external diameter of 50 mm and the turn number of 5000;

the permanent magnet is an Nd—Fe—B permanent magnet with a weight of about 165 g, a diameter of 50 mm, a thickness of 10 mm and the surface magnetic intensity of 180 mT; and a power generation method for the above-mentioned superconducting power generation device specifically includes: the permanent magnet is placed above the container, the cooling medium is introduced to the container via the cooling channel to cool the superconductor, and thus when the temperature of the superconductor is lower than a superconducting critical temperature thereof, the superconductor is capable of capturing the magnetic flux and generating the magnetic levitation force for the permanent magnet so as to further levitate the permanent magnet; and then, a glass bead with the weight of 2.3 g is used to fall on the levitated permanent magnet from a height of 10 cm to measure a voltage signal of the conductive coil, so that an induced voltage which is about 0.6 V may be obtained.

Embodiment 5

The embodiment of the present application provides a superconducting power generation device including a container, a superconductor, a conductive coil and a permanent magnet, the superconductor and the conductive coil are both located in the container, the conductive coil is located above the superconductor, the permanent magnet is located above the container in which a cooling channel is formed, and a cooling medium is introduced to the container via the cooling channel and is capable of cooling the superconductor;

the superconductor is made of $YBa_2Cu_3O_7$ and is manufactured by using a method including a commercially purchased $YBa_2Cu_3O_7$ strip with the length of 50 mm, the width of 10 mm and the thickness of 1 mm is wrapped and packaged to form a cubic superconductor (with the length of 50 mm, the width of 50 mm and the thickness of 10 mm);

a manufacturing method of the conductive coil includes: a 0.1 mm enamelled copper wire is used to customize a conductive coil with an internal diameter of 5 mm, an external diameter of 50 mm and the turn number of 5000;

the permanent magnet is an Nd—Fe—B permanent magnet with a weight of about 165 g, a diameter of 50 mm, the thickness of 10 mm and the surface magnetic intensity of 180 mT; and a power generation method for the above-mentioned superconducting power generation device specifically includes: the permanent magnet is placed above the container, the cooling medium is introduced to the container via the cooling channel to cool the superconductor, and thus when the temperature of the superconductor is lower than a superconducting critical temperature thereof, the superconductor is capable of capturing the magnetic flux and generating the magnetic levitation force for the permanent magnet so as to further levitate the permanent magnet; and then, a glass bead with the weight of 10.4 g is used to fall on the levitated permanent magnet from a height of 20 cm to measure a voltage signal of the conductive coil, so that an induced voltage which is about 3.9 V may be obtained.

Embodiment 6

The embodiment of the present application provides a superconducting power generation device including a container, a superconductor, a conductive coil and a permanent magnet, the superconductor and the conductive coil are both located in the container, the conductive coil is located above the superconductor, the permanent magnet is located above the container in which a cooling channel is formed, and a cooling medium is introduced to the container via the cooling channel and is capable of cooling the superconductor;

the superconductor is made of $YBa_2Cu_3O_7$ and is manufactured by using a method including: a commercially purchased $YBa_2Cu_3O_7$ strip with the length of 50 mm, the width of 10 mm and the thickness of 1 mm is wrapped and packaged to form a cubic superconductor (with the length of 50 mm, the width of 50 mm and the thickness of 10 mm);

a manufacturing method of the conductive coil includes: a 0.1 mm enamelled copper wire is used to customize a conductive coil with an internal diameter of 5 mm, the external diameter of 50 mm and the turn number of 5000;

the permanent magnet is an Nd—Fe—B permanent magnet with a weight of about 165 g, a diameter of 50 mm, a thickness of 10 mm and the surface magnetic intensity of 180 mT; and a power generation method for the above-mentioned superconducting power generation device specifically includes: the permanent magnet is placed above the container, the cooling medium is introduced to the container via the cooling channel to cool the superconductor, and thus, when the temperature of the superconductor is lower than a superconducting critical temperature thereof, the superconductor is capable of capturing the magnetic flux and generating the magnetic levitation force for the permanent magnet so as to further levitate the permanent magnet; and then, a weight with the weight of 330 g is used to fall on the ground with the same horizontal plane as the superconducting power generation device and 40 cm away from the superconducting power generation device from a height of 20 cm to achieve container vibration caused by ground vibration, and then, the magnetic flux passing through the conductive coil is changed to measure a voltage signal of the conductive coil, so that an induced voltage which is about 1.25 V may be obtained.

Figure 2:
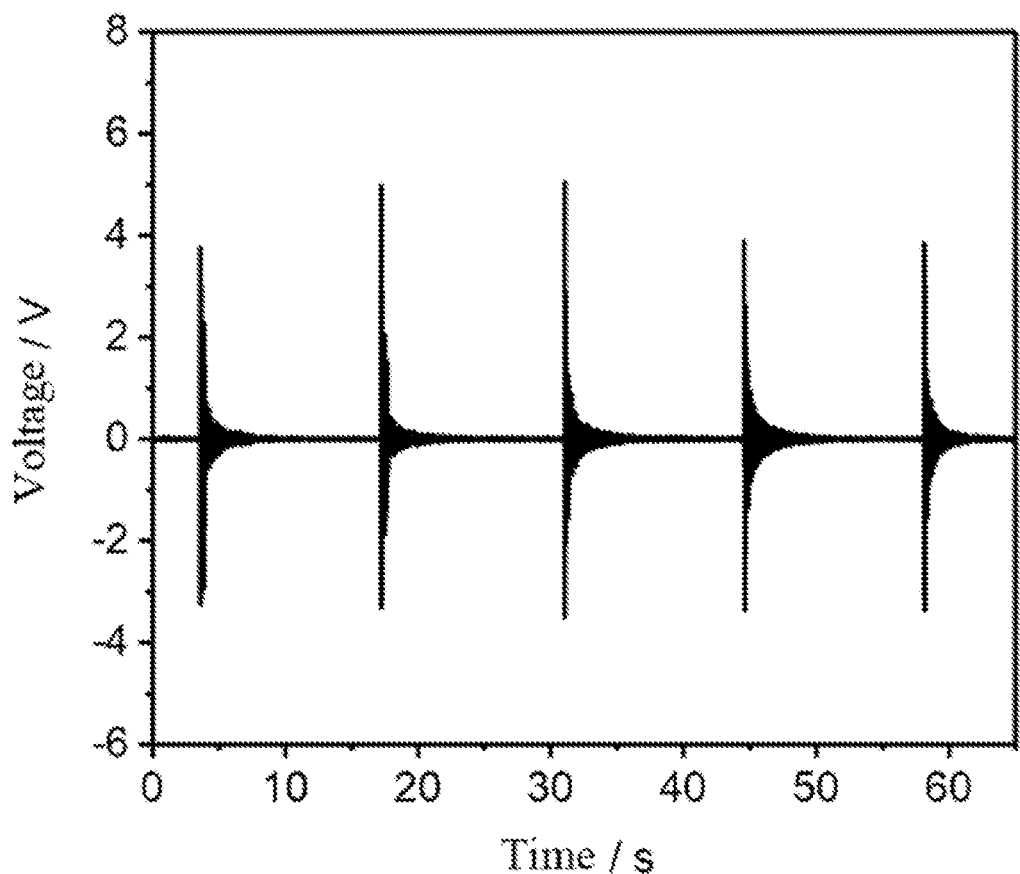
FIG. 2 shows a diagram of a voltage-time curve generated by the superconducting power generation device provided by the present disclosure when an external weight falls on a permanent magnet.

FIG. 2 shows a diagram of a voltage-time curve generated by the superconducting power generation device provided in embodiment 2 of the present disclosure when an external weight falls on a permanent magnet. During collision from a foreign object, a series of peaks showing that a voltage is gradually damped to be reduced are generated. During collision from another foreign object, a voltage peak similar to be regular appears. It should be noted that the foreign objects used in the different collision processes are glass beads with the weights of 10.4 g and fall on the levitated permanent magnet from a height of 20 cm.

Figure 3:
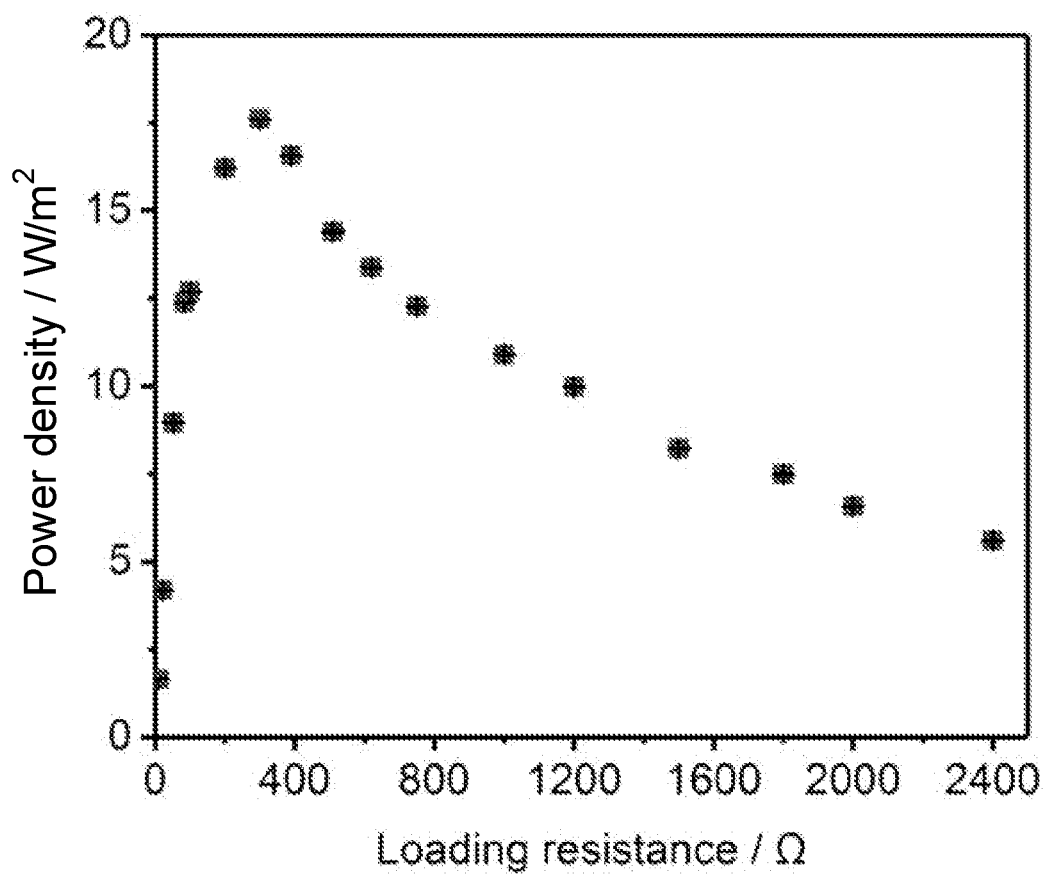
FIG. 3 shows a diagram of output power density to different load resistance when the superconducting power generation device provided by the present disclosure supplies power to an external circuit.

FIG. 3 shows a diagram of output peak power density to different load resistance when the superconducting power generation device provided in the embodiment 4 of the present disclosure supplies power to an external circuit. During test, a peak value of an external voltage supplied to loads by the superconducting power generation device after the collision is measured by keeping collision parameters of the foreign objects certain (specifically, 10.4 g glass beads are adopted to fall on the levitated permanent magnet from a height of 20 cm) and merely changing the values of the load resistance, and then, the peak power density of an output voltage is calculated according to the resistance values of the loads.

The above descriptions are not intended to limit the present disclosure, but merely used as preferred implementation manners thereof. Any modifications, equivalent replacements, improvements and the like made within the spirit and principle of the present disclosure shall fall within the protective scope of the present disclosure.

What is claimed is:

1. A power generation method, comprising the following steps:
    providing a superconducting power generation device;
        wherein the superconducting power generating device comprising:
        a superconductor made of a second-type superconducting material; wherein the second-type super conducting material is $YBa_2Cu_3O_7$, and the superconductor is manufactured by wrapping a $YBa_2Cu_3O_7$ strip with a length of 50 mm, a width of 10 mm and a thickness of 1 mm to form a cubic superconductor;
        a conductive coil located above the superconductor; wherein the conductive coil is made of 0.1 mm enameled copper wire, and an inner diameter of the conductive coil is 5 mm, an outer diameter of the conductive coil is 50 mm, and the turn number of the conductive coil is 6000;
        a permanent magnet located above the conductive coil; wherein the permanent magnet is an Nd—Fe—B permanent magnet with a weight of 165 g, a diameter of 50 mm, a thickens of 10 mm, and a surface magnetic intensity of 180 mT; and
        a cooling medium used for cooling the superconductor until the temperature is lower than a superconducting critical temperature wherein the superconductor generates a magnetic levitation force after being cooled so as to levitate the permanent magnet; and
        a container, wherein the superconductor and the conductive coil are both located in the container, the permanent magnet is located outside the container in which a cooling channel is further formed, and a cooling medium enters the container via the cooling channel and cools the superconductor,
    introducing the cooling medium so that the superconductor is cooled to capture a magnetic flux and generate a magnetic levitation force to levitate the permanent magnet; and
    applying an acting force to the permanent magnet to make the permanent magnet vibrate to change relative positions of the permanent magnet and a conductive coil, change the magnetic flux passing through the conductive coil and further generate an induced electromotive force by induction, so that conversion from mechanical energy to electric energy is achieved; wherein the acting force is provided by dropping a glass bead with weight of 10.4 g from a height of 20 cm.

2. The power generation method of claim 1, wherein the cooling medium comprises any one of liquefied $CF_4$, liquid nitrogen, liquid hydrogen and liquid helium.

3. The power generation method of claim 1, wherein the container is further filled with thermal insulation material.

* * * * *